(12) United States Patent
Takaki

(10) Patent No.: US 11,091,153 B2
(45) Date of Patent: Aug. 17, 2021

(54) VEHICLE CONTROL APPARATUS AND VEHICLE CONTROL METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 16/302,496

(22) PCT Filed: May 16, 2017

(86) PCT No.: PCT/JP2017/018409
§ 371 (c)(1),
(2) Date: Nov. 16, 2018

(87) PCT Pub. No.: WO2017/199971
PCT Pub. Date: Nov. 23, 2017

(65) Prior Publication Data
US 2019/0232956 A1    Aug. 1, 2019

(30) Foreign Application Priority Data

May 19, 2016 (JP) .............................. JP2016-100809
Nov. 18, 2016 (JP) .............................. JP2016-225193

(51) Int. Cl.
*G06K 9/00* (2006.01)
*B60W 30/09* (2012.01)
(Continued)

(52) U.S. Cl.
CPC ........ *B60W 30/09* (2013.01); *B60W 30/0956* (2013.01); *G01S 13/867* (2013.01);
(Continued)

(58) Field of Classification Search
None
See application file for complete search history.

(56) References Cited

U.S. PATENT DOCUMENTS

| 2007/0030131 | A1* | 2/2007 | Takahama | ............. | G01S 17/931 340/435 |
|---|---|---|---|---|---|
| 2009/0135065 | A1 | 5/2009 | Tsuchida et al. | | |

(Continued)

FOREIGN PATENT DOCUMENTS

| JP | 2004-151922 | 5/2004 |
|---|---|---|
| JP | 2006-240454 | 9/2006 |

(Continued)

*Primary Examiner* — James M Mcpherson
(74) *Attorney, Agent, or Firm* — Maschoff Brennan

(57) ABSTRACT

An ECU performs collision avoidance control for an avoiding collision with an object based on at least one of first information, which is a detection result of the object based on a reflected wave corresponding to a transmission wave, and second information, which is a detection result of the object based on a captured image of an area in front of a vehicle captured by an image capturing means. When the state changes from a state where the object is detected by the first information and the second information to a state where the object is detected only by the first information, the ECU determines whether or not the object is located in a near area predetermined as an area in front of the vehicle in which the second information is not be able be acquired. When it is determined that the object is located in the near area, the ECU maintains an activation condition of the collision avoidance control to that in the state where the object is detected by the first information and the second information.

9 Claims, 14 Drawing Sheets

(51) Int. Cl.
*B60W 30/095* (2012.01)
*G01S 13/931* (2020.01)
*G01S 13/89* (2006.01)
*G01S 13/86* (2006.01)

(52) U.S. Cl.
CPC ............ *G01S 13/89* (2013.01); *G01S 13/931* (2013.01); *G06K 9/00805* (2013.01); *B60W 2420/42* (2013.01); *B60W 2554/00* (2020.02); *B60W 2554/80* (2020.02); *B60W 2554/803* (2020.02); *G01S 2013/93185* (2020.01)

(56) References Cited

U.S. PATENT DOCUMENTS

| | | | | |
|---|---|---|---|---|
| 2014/0333467 | A1* | 11/2014 | Inomata | G01S 7/415 |
| | | | | 342/27 |
| 2015/0234045 | A1* | 8/2015 | Rosenblum | G01S 13/86 |
| | | | | 342/71 |
| 2015/0262375 | A1* | 9/2015 | Inomata | G06T 7/20 |
| | | | | 382/107 |

FOREIGN PATENT DOCUMENTS

| | | |
|---|---|---|
| JP | 2008-008679 | 1/2008 |
| JP | 2011-164989 | 8/2011 |
| JP | 2014-006123 | 1/2014 |

\* cited by examiner

VEHICLE CONTROL APPARATUS AND VEHICLE CONTROL METHOD

CROSS-REFERENCE TO RELATED APPLICATIONS

The present application is a national stage application under 35 U.S.C. § 371(c) of PCT Application No. PCT/JP2017/018666 PCT/JP2017/018409, filed on May 4416, 2017, which is based on Japanese Application No. 2016-100809 filed on May 19, 2016 and Japanese Application No. 2016-225193 filed on Nov. 18, 2016, the descriptions of which are incorporated herein by reference.

TECHNICAL FIELD

The present disclosure relates to a vehicle control apparatus configured to detect an object located in front of a vehicle, and a vehicle control method.

BACKGROUND ART

There is a known technique that synthesizes an object detection result based on reflected waves corresponding to transmission waves and an object detection result acquired by an image sensor, and generates new information (fusion target) for this object. The generated fusion target makes it possible to improve accuracy in recognizing an object in front of a vehicle. Further, using position information and the width of the object specified using the information, it is possible to appropriately implement collision avoidance control of the vehicle when avoiding a collision with the object.

It is known that object detection results acquired by an image sensor are unstable compared to object detection results based on reflected waves. For example, the image sensor may not detect an object present in front of the vehicle because the surroundings of the vehicle is dark. Hereinafter, a state where an object cannot be detected by an image sensor will be described as image loss. Therefore, PTL 1 discloses a vehicle control apparatus that continues the collision avoidance control based on the object detection result of the radar sensor when image loss has occurred after a fusion target is generated. In this vehicle control apparatus, since accuracy in detecting an object decreases after the image loss, actuation of the collision avoidance control is hindered.

CITATION LIST

Patent Literature

[PTL 1] Japanese Unexamined Patent Application Publication No. 2007-226680

SUMMARY OF THE INVENTION

Other than the image loss due to brightness of the surroundings of the vehicle, image loss may also occur by the object and the vehicle getting close to each other. Specifically, when the object and the vehicle get close to each other, the object exits from an angle of view of the image sensor and the image sensor cannot properly detect the object, and thus image loss occurs. When activation of the collision avoidance control is hindered because of the image loss due to the proximity of the object and the vehicle, the risk of the collision avoidance control being delayed or inactivated rises.

The present disclosure has been made in view of the above-described problem, and an object thereof is to provide a vehicle control apparatus and a vehicle control method capable of suppressing activation delay and inactivation of collision avoidance control.

The present disclosure provides a vehicle control apparatus for detecting an object using first information which is a detection result of the object based on a reflected wave corresponding to a transmission wave, and second information which is a detection result of the object based on a captured image of an area in front of a vehicle captured by an image capturing means, the vehicle control device including: a control section which performs collision avoidance control for avoiding a collision with the object based on at least one of the first information and the second information; a position determination section which, when a state changes from a state where the object is detected by the first information and the second information to a state where the object is detected only by the first information, determines whether or not the object is located in a near area predetermined as an area in front of the vehicle in which the second information is not be able to be acquired; and a maintaining section which, when it is determined that the object is located in the near area, maintains an activation condition of the collision avoidance control to that in the state where the object is detected by the first information and the second information.

According to the disclosure configured as described above, when the state changes from a state where the object is detected by the first information and the second information to a state where the object is detected only by the first information, the activation condition of the collision avoidance control is maintained if the position of the object is in the near area in front of the vehicle. According to this configuration, even when image loss occurs due to the object entering the near area, it is possible to suppress activation delay or inactivation of the collision avoidance control for the object.

BRIEF DESCRIPTION OF THE DRAWINGS

The above and other objects, features, and advantages of the present disclosure will become clearer from the following detailed description with reference to the accompanying drawings. In the drawings.

DESCRIPTION OF THE EMBODIMENTS

Figure 1:
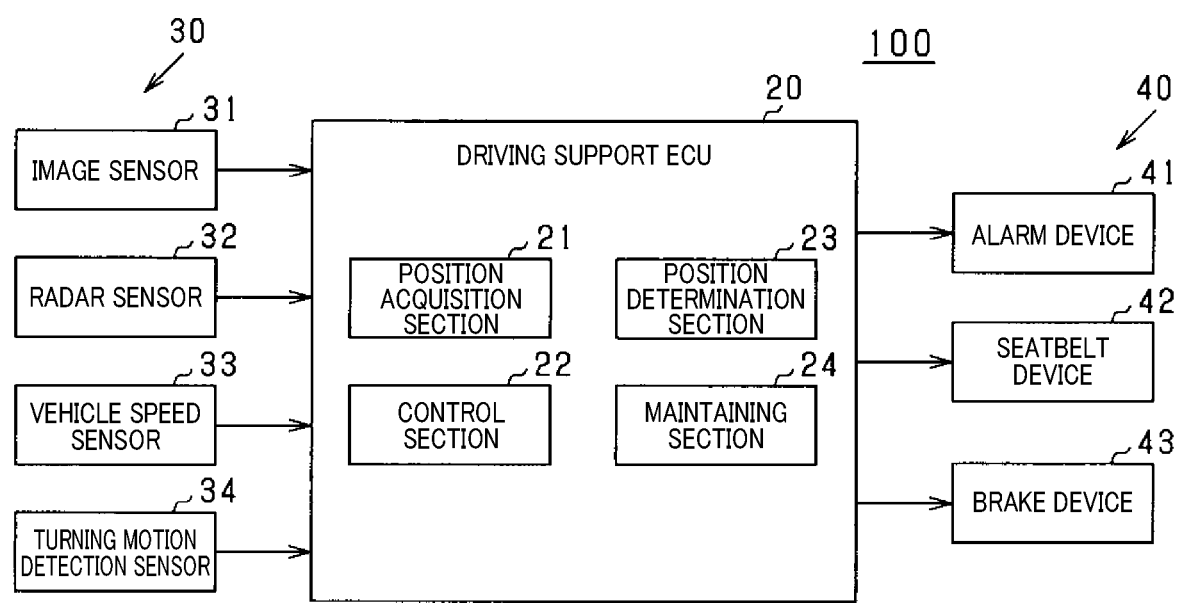
FIG. 1 is a configuration diagram of a PCSS.

Embodiments will be described below with reference to the drawings. The same or equivalent parts in the embodiments described below are assigned with the same reference number in the drawings, and an earlier explanation should be referred to regarding those parts having the same reference number as another.

First Embodiment

The vehicle control apparatus and the vehicle control method according to the present embodiment are implemented by a PCSS (Pre-crash safety system) installed in a vehicle (own vehicle CS) and configured to detect an object present in front of the own vehicle CS and perform various controls in order to avoid or alleviate a collision with the object. In addition, in FIG. 1, a PCSS 100 includes a driving support ECU 20 (hereinafter referred to as ECU 20), various sensors 30, and controlled objects 40. In FIG. 1, the ECU 20 functions as a vehicle control apparatus.

The various sensors 30 are connected to the ECU 20, and they output detection results related to the object or the own vehicle CS to the ECU 20. In FIG. 1, the PCSS 10 includes, as the various sensors 30, an image sensor 31, a radar sensor 32, a vehicle speed sensor 33, and a turning motion detection sensor 34.

The image sensor 31 is a CCD camera, a monocular camera, a stereo camera, or the like, and is installed, for example, near the upper end of the windshield of the own vehicle CS. The image sensor 31 obtains a captured image by capturing an image of an area in front of the own vehicle CS extending in a certain range at predetermined time intervals. Then, by processing the captured image, the position and orientation of the object in front of the own vehicle CS are acquired as image information and output to the ECU 20. Hereinafter, an object whose image information is detected by the image sensor 31 will also be referred to as an image target IT. In this embodiment, the image sensor 31 functions as an image capturing means.

Figure 2A:
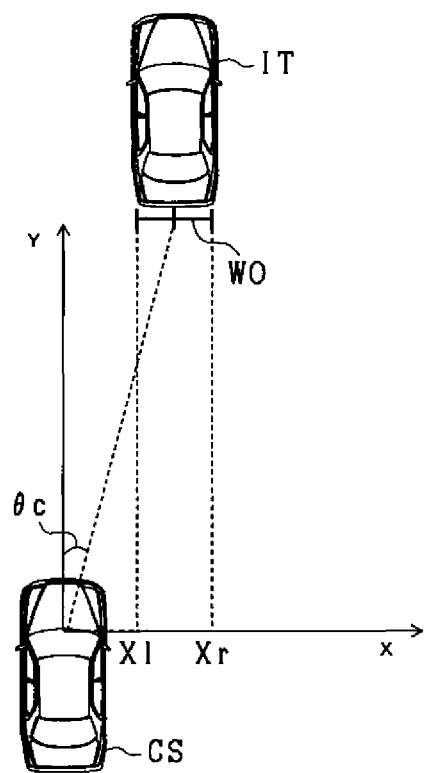
FIG. 2A is a diagram showing a position of an object detected by an image sensor and a radar sensor.

As shown in FIG. 2A, the image information includes a position of the image target IT on a coordinate system defined by the vehicle traveling direction (Y axis) and the lateral direction (X axis) in which the own vehicle CS serves as a reference position. In FIG. 2A, the image information includes left and right lateral positions Xr, Xl of the image target IT in the lateral direction (X axis), and an azimuth angle θc indicating the azimuth from the own vehicle CS to the object Ob. The ECU 20 can calculate an object width WO from the lateral positions Xr and Xl of the image target IT.

The radar sensor 32 acquires radar information which is a detection result of the object based on reflected waves corresponding to transmission waves. The radar sensor 32 is attached at a front part of the own vehicle CS so that the optical axis of the radar sensor 32 is directed forward (Y axis direction) from the vehicle, and transmits the transmission waves forward from the vehicle so as to scan the area in front of the vehicle and receive the reflected waves reflected from the surface of the object. Then, according to the reflected waves, radar information indicating the distance to the object, the relative speed with respect to the object, and the like is generated. Electromagnetic waves having directivity such as millimeter waves can be used as the transmission waves.

Figure 2B:
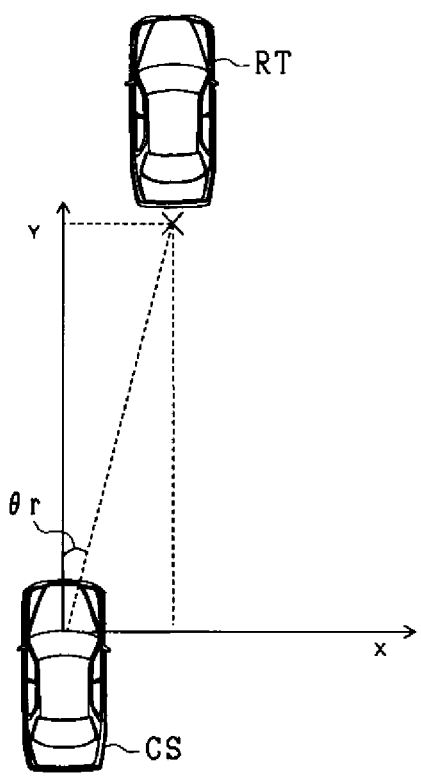
FIG. 2B is a diagram showing a position of an object detected by the image sensor and the radar sensor.

As shown in FIG. 2B, the radar information includes a position of the radar target RT in the vehicle traveling direction (Y axis) with respect to the own vehicle CS and an azimuth angle θr from the own vehicle CS to the radar target RT. Based on the position of the radar target RT in the vehicle traveling direction (Y axis), the ECU 20 can obtain a relative distance Dr, which is the distance in the Y axis from the own vehicle CS to the radar target RT. Based on this relative distance Dr, the ECU 20 can obtain a relative speed Vr of the radar target RT with respect to the own vehicle CS. In this embodiment, the radar information serves as first information, and the image information serves as second information.

The vehicle speed sensor 33 is provided to a rotating shaft that transmits power to the wheels of the own vehicle CS, and calculates vehicle speed, which is the speed of the own vehicle CS, based on the rotational speed of the rotating shaft.

The turning motion detection sensor 34 detects a turning angular velocity at which the own vehicle CS changes from the vehicle traveling direction. For example, the turning motion detection sensor 34 is configured by a yaw rate sensor for detecting a turning angular velocity of the own vehicle CS, or a steering angle sensor for detecting a steering angle of a steering device (not shown). The ECU 20 can determine whether or not the own vehicle CS is making a turning motion based on the output from the turning motion detection sensor 34.

The ECU 20 is configured by a well-known microcomputer and includes a CPU, ROM, RAM, and the like. By executing the programs stored in the ROM, the ECU 20 functions as a position acquisition section 21, a control section 22, a position determining section 23, and a maintaining section 24. First, PCS (collision avoidance control) executed by the ECU 20 will be described.

The position acquisition section 21 acquires position information of the object in front of the own vehicle from image information which is an object detection result of the image sensor 31 or radar information which is an object detection result of the radar sensor 32.

When both the image information and the radar information have been acquired for the same object, the control section 22 fuses the image information and the radar information and generates fusion information as the new position information for this object. For example, the generated fusion information includes the relative distance Dr according to the radar information as the position of the object in the traveling direction (on the Y axis) of the own vehicle CS, and the lateral position according to the image information as the position of the own vehicle in the lateral direction (on the X axis) and the object width WO. When generating fusion information for an object in the above manner, information on the object is generated by using the more accurate one of the information acquired by the radar sensor 32 and the information acquired by the image sensor 31, and thus recognition accuracy of the object can be improved. Hereinafter, the object for which fusion information is generated will be described as a fusion target FT.

The control section 22 determines a probability of a collision between the object for which the position information has been detected and the own vehicle CS, and controls operation of the PCS based on the determined collision probability. For example, the control section 22 determines a probability of a collision between the own vehicle CS and the object, based on a lap ratio RR which is the ratio of overlap in the X axis direction between the object width WO and a judging area Wcd, and the operation of the PCS is controlled based on the determination result. Here, the judging area Wcd is an area virtually set in front of the own vehicle CS.

Figure 3:
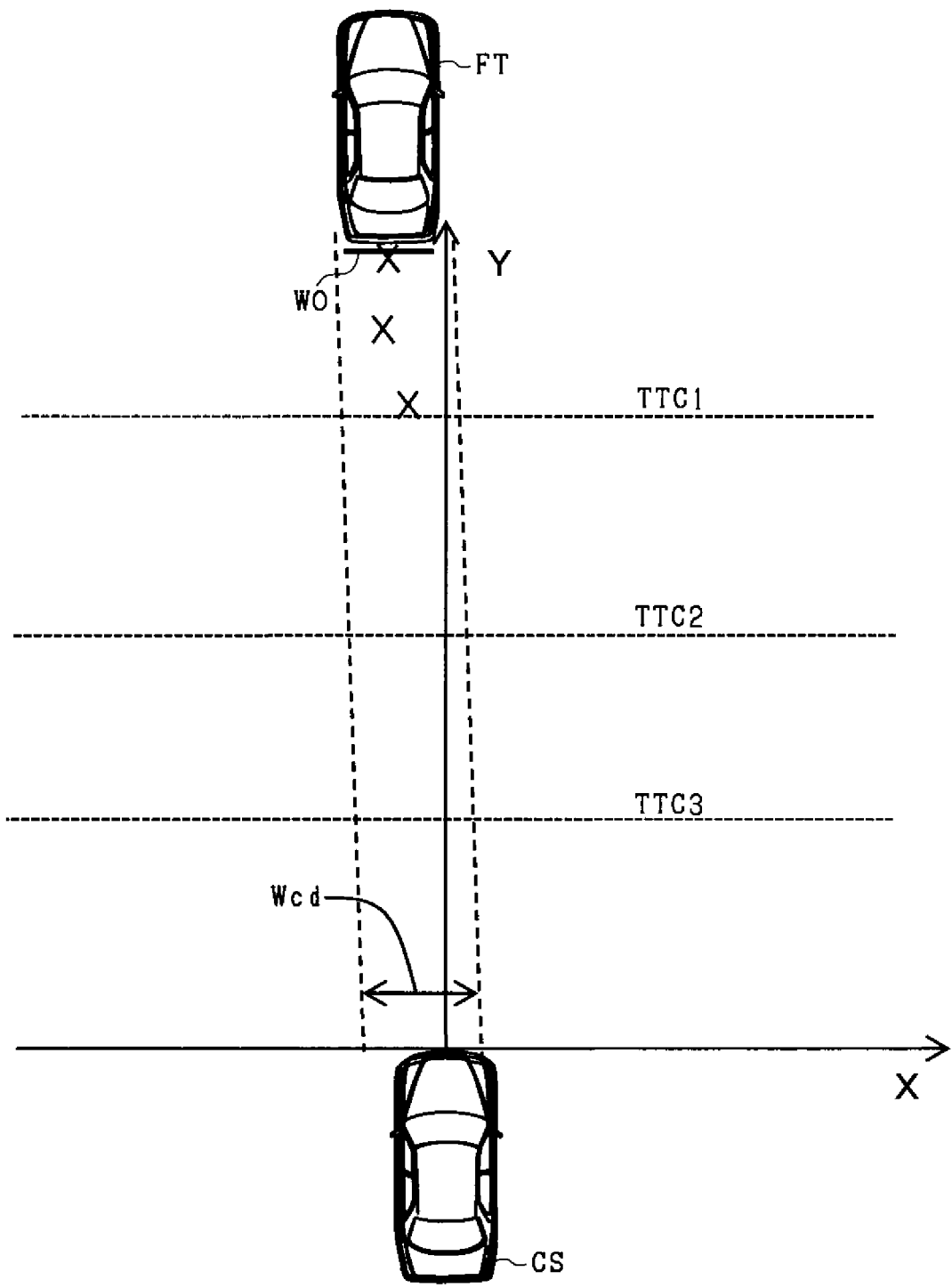
FIG. 3 is a diagram for explaining a PCS.

When the lap ratio RR is equal to or more than a predetermined value, as shown in FIG. 3, a collision margin time TTC (Time to Collision) for the object is calculated by, for example, dividing the relative distance Dr by the relative speed Vr with respect to the object. The TTC is an evaluation value indicating after how many seconds it will collide with the object assuming that the own vehicle keeps running at the current speed, and the smaller the TTC, the higher the risk of a collision, and the greater the TTC, the lower the risk of a collision. In FIG. 3, the value becomes smaller in order of TTC1, TTC2, and TTC3. The control section 22 compares the calculated present time TTC with the TTC set for each controlled object 40, and activates the corresponding controlled objects 40 when the controlled objects 40 that should be activated exist.

In the PCSS 100 shown in FIG. 1, the controlled objects 40 include an alarm device 41, a seatbelt device 42, and a brake device 43, and certain activation timing (TTC) is set for each controlled object 40. Therefore, the ECU 20 compares the TTC with the operation timing of each controlled object 40, and activates each controlled object 40 when the TTC corresponds to the activation timing of the controlled object 40.

For example, when the TTC becomes the activation timing of the alarm device 41, an alarm is issued to the driver by activating the alarm device 41. When the TTC becomes the activation timing of the seatbelt device 42, the seatbelt device 42 is controlled so as to be wound up. When the TTC becomes the activation timing of the brake device 43, the automatic brake is activated to reduce the collision speed. Thus, a collision between the own vehicle CS and the object is avoided or alleviated.

Further, if the image information has become unable to be detected and image loss has occurred after generating the fusion information, the control section 22 changes the activation conditions of the PCS under certain conditions. An object that has been once recognized as a fusion target FT is likely to exist ahead of the own vehicle. Therefore, even after the object is no longer recognized as a fusion target FT, it is preferable not to exclude it from the target of the PCS but to continue the PCS for the object. Thus, when image loss has occurred after generating fusion information, the PCSS 100 continues the PCS based on the radar information and the previous object width WO. On the other hand, when image loss occurs, the image target IT cannot be acquired from the image sensor 31, and the object width WO cannot be newly acquired. Therefore, after image loss, a previous object width WO obtained when the fusion target FT was still detected is decreased and the decreased previous object width WO is used so that the activation condition is changed in such a manner that the PCS becomes less likely to be activated under certain conditions, thereby coping with the decrease in detection accuracy.

Figure 4A:
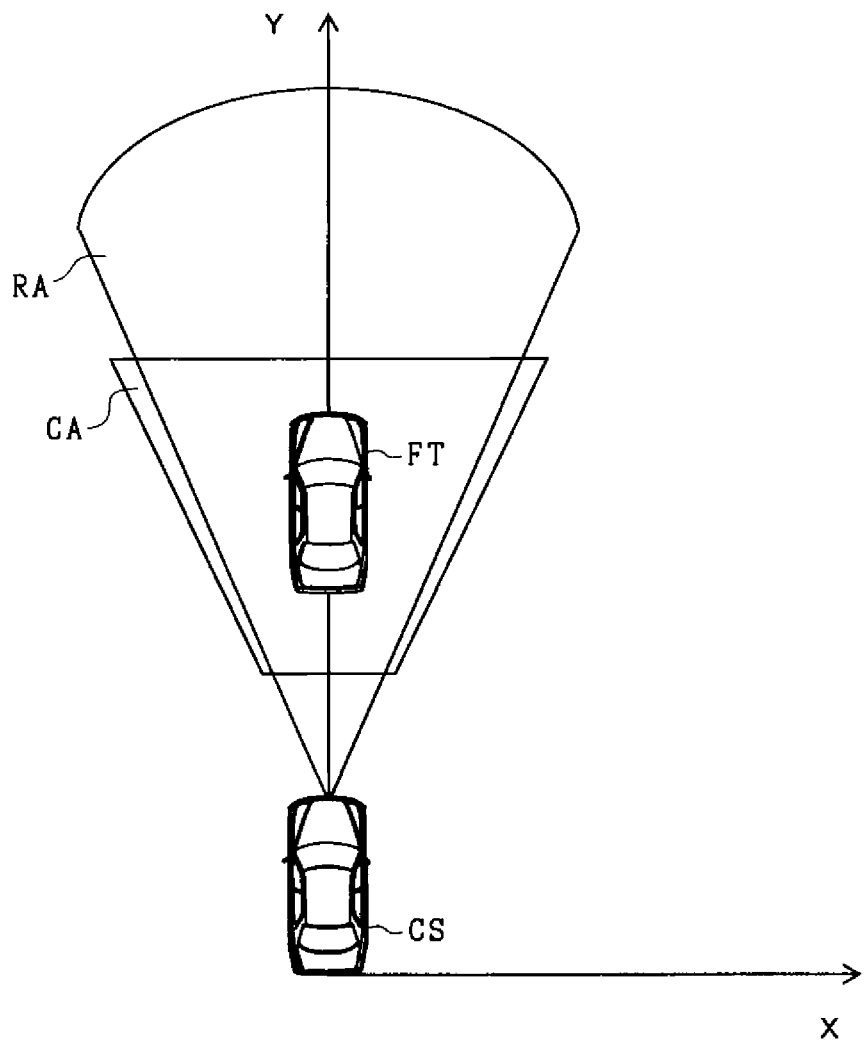
FIG. 4A is a diagram for explaining the cause of image loss.

As shown in FIG. 4A, a detection area (referred to as an image capturing area CA) of the object of the image sensor 31 is narrower in the vehicle traveling direction (the Y axis direction) as compared with a detection area of the object of the radar sensor 32 (referred to as a radar area RA). Therefore, when the object exists at a position overlapping with the image capturing area CA and the radar area RA in front of the own vehicle CS, it can be detected as the fusion target FT. On the other hand, when the object is located far or near in the Y axis direction from the image capturing area CA, image loss occurs. Hereinafter, the area that is closer to the own vehicle than the image capturing area CA in the vehicle traveling direction will also be referred to as a near area NA.

Figure 4B:
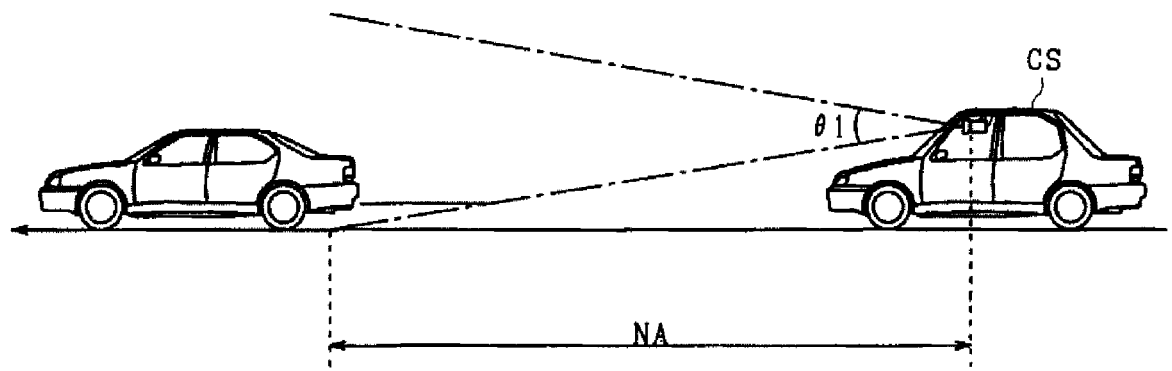
FIG. 4B is a diagram for explaining the cause of image loss.

As shown in FIG. 4B, when the object is located in the near area NA, since the lower end of the rear end part of the object is outside an angle of view θ1 of the image sensor 31, the image sensor 31 cannot identify the type of the image target IT and image loss occurs. Here, the near area NA is a near area in front of the own vehicle CS, and if the activation condition is changed so that the PCS becomes less likely to be activated when image information is lost for this near area NA, activation delay or inactivation of the PCS may be induced. Therefore, when image loss has occurred due to the object entering this near area NA, the control section 22 maintains the activation condition of the PCS for this object.

When the state changes from a state in which the fusion information is generated for the object to a state in which the object is detected only from the radar information, the position determination section 23 determines whether or not the object is located in the near area NA. As shown in FIG. 4B, the near area NA has an extent in the Y-axis direction and the X-axis direction which is preset based on the angle of view θ1 extending in the vertical direction of the image sensor 31. For example, the extent of the near area NA is set based on the relationship between the angle of view θ1 in the vertical direction of the image sensor 31 and the position in the height direction of the own vehicle CS at which the image sensor 31 is attached.

When the position determining section 23 determines that the object is located in the near area NA, the maintaining section 24 maintains the activation condition of the PCS from the state where the fusion target FT is detected. In this embodiment, the maintaining section 24 maintains the activation condition of the PCS by not allowing the control section 22 to reduce the object width WO in the lateral direction (X axis direction).

Figure 5:
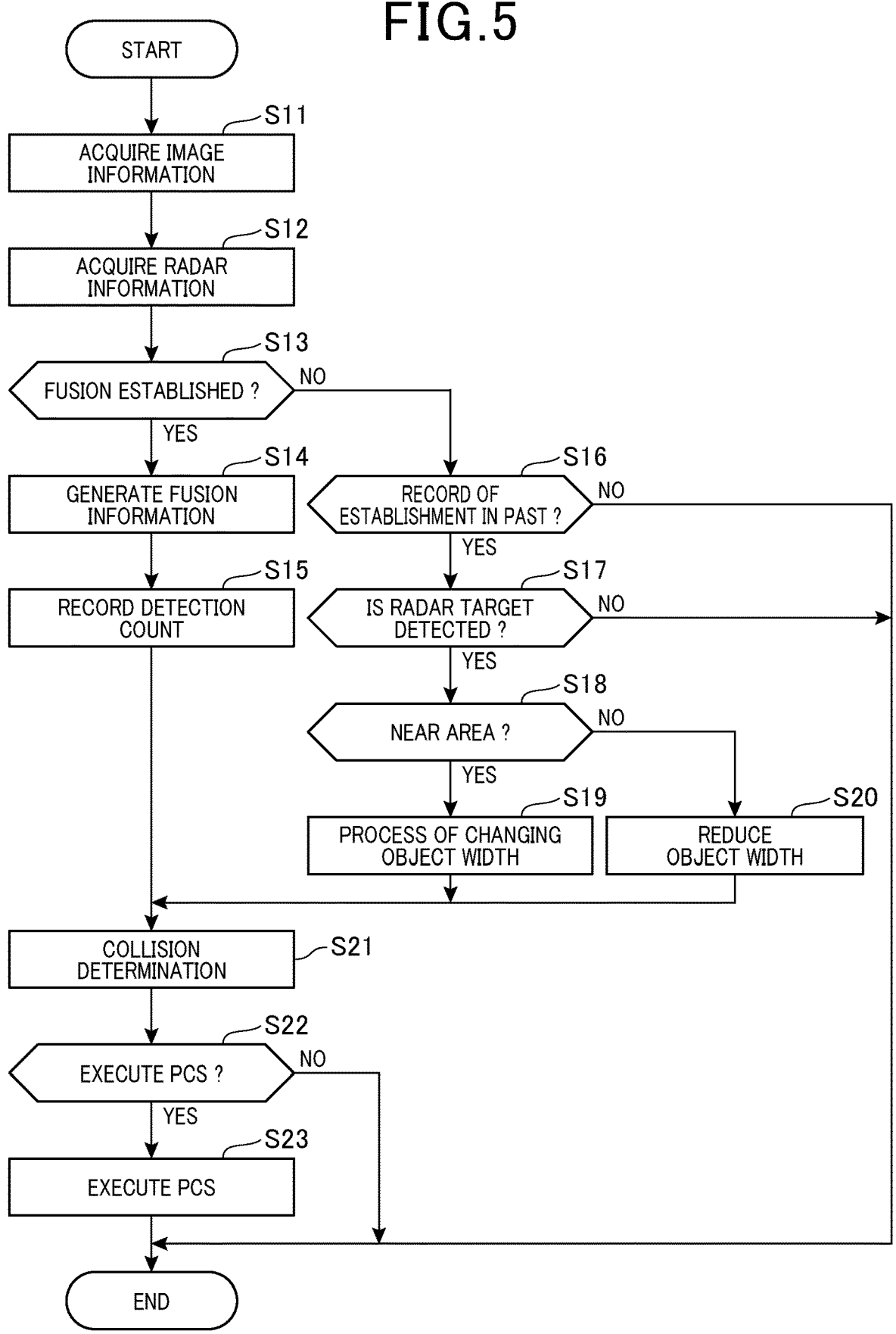
FIG. 5 is a flowchart for explaining the PCS.

Next, the PCS executed by the ECU 20 will be described with reference to the flowchart of FIG. 5. The process shown in FIG. 5 is repeatedly executed by the ECU 20 at a predetermined cycle.

In step S11, image information is acquired based on the output from the image sensor 31. In step S12, radar information is acquired based on the output from the radar sensor 32.

In step S13, presence or absence of detection of a fusion target FT is determined. When the object is detected from each of the image information and the radar information, and it is determined that the image target IT and the radar target RT are the same object, the process proceeds to step S14. For example, if the difference between the position of the image target IT based on the image information acquired in step S11 and the position of the radar target RT based on the radar information acquired in step S12 is equal to or less than a predetermined distance, it is determined that the image target IT and the radar target RT are the same object (fusion target FT). On the other hand, when the image information or the radar information has not been acquired, or when the difference between the position of the image target IT and the position of the radar target RT exceeds a predetermined distance, it is determined that the image target IT and the radar target RT are different from each other.

In step S14, the image information acquired in step S11 and the radar information acquired in step S12 are synthesized to generate fusion information which is position information for the fusion target FT. The fusion information includes the object width WO in addition to the position of the object.

In step S15, a detection count DN, which is the number of times the fusion target FT has been detected, is recorded. The detection count DN is information indicating the number of times a fusion target FT of the same type is continuously detected. In this embodiment, in step S13, the detection count DN is increased each time a fusion target FT of the same type is detected.

In step S21, an object collision determination is performed. First, it is assumed that a fusion target FT is detected in step S13. The collision determination for the object and the own vehicle CS is carried out using the lap ratio RR of the object width WO and the judging area Wcd included in the fusion information calculated in step S14.

In step S22, it is determined whether or not the PCS should be carried out. When it is determined that there is a probability of a collision with the object in step S21, the TTC is calculated by dividing the relative distance Dr by the relative speed Vr with respect to the object, and the calculated TIC is compared with the respective TTCs set for controlled sections 40 to determine whether each operation should be executed or not. When the PCS should be executed (step S22: YES), in step S23, the relevant operation of the PCS is executed. On the other hand, when the PCS should not be executed (step S22: NO), the process shown in FIG. 5 halts. Steps S21 to S23 serve as controlling steps.

On the other hand, when a fusion target FT is not detected in step S13, it is determined in step S16 whether or not detection of a fusion target was established previously for the same object. For example, whether or not a fusion target FT was detected in a prior process is determined by referring to the detection count DN. If a fusion target FT was not detected in a prior process (step S16: NO), the process shown in FIG. 5 halts.

If a fusion target FT is detected for the same object (step S16: YES), in step S17, it is determined whether or not the radar target RT is continuously detected. This is because even if image loss occurs, if the position of the object can be detected by the radar sensor 32, the object is present in the radar area RA. When the radar target RT is not detected (step S17: NO), it is determined that there is no object in front of the own vehicle, and the process in FIG. 5 halts. Therefore, the object will be excluded from the target of the PCS. On the other hand, when the radar target RT is detected (step S17: YES), it is determined that image loss has occurred, and the process proceeds to step S18.

In step S18, it is determined whether or not the radar target RT is located in the near area NA. In this embodiment, the near area NA is set as an area defined in the vehicle traveling direction (Y axis direction) and the lateral direction (X axis direction). Based on the radar information obtained in step S12, it is determined whether or not the position of the radar target RT is located in the area set as the near area NA. Step S18 serves as a position determination step.

Figure 6:
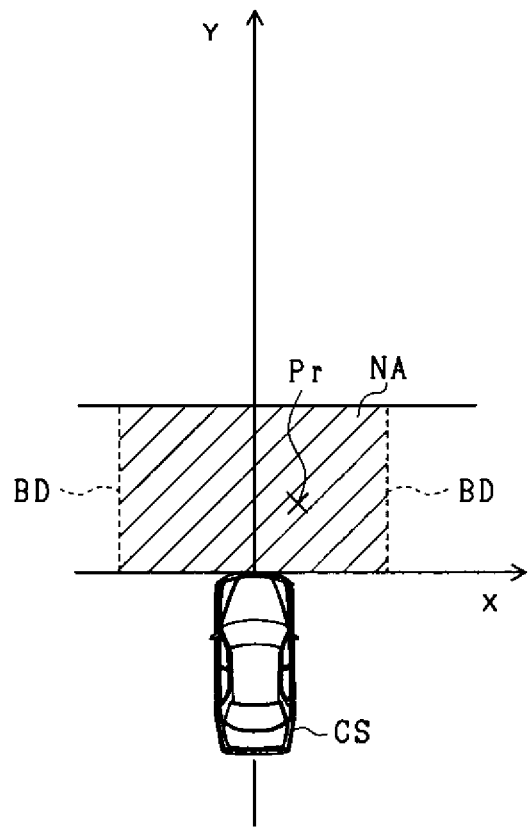
FIG. 6 is a diagram for explaining a near area NA.

As shown in FIG. 6, the lines at a certain distance from the center of the own vehicle CS in the lateral direction is defined as a boundary lines BD in the lateral direction of the near area NA. Note that the range of the near area NA in the vehicle traveling direction is determined based on the angle of view of the image sensor 31. When the lateral position of the position Pr of the radar target RT is inside the lateral range of the near area NA defined by the boundary lines BD, it is determined that the object is located in the near area NA. On the other hand, when the position Pr is outside the defined near area NA in the lateral direction, it is determined that the object is not located in the near area NA. In this embodiment, the boundary lines BD are set as predetermined fixed values based on the image capturing area CA of the image sensor 31. Alternatively, the boundary lines BD may be changed in the lateral direction according to the type of the object.

When the radar target RT is not located in the near area NA (step S18: NO), in step S20, the activation condition of the PCS is changed by reducing the object width WO. In this case, since it is likely that the object Ob is located far from the image capturing area CA in the vehicle traveling direction, the probability of a collision between the object Ob and the own vehicle CS is low. Therefore, priority is given to the low reliability of the object width WO acquired previously, and the object width WO is reduced in the lateral direction. That is, in this embodiment, the lap ratio RR associated with the object width WO is used as the activation condition of the PCS. Then, in step S21, collision determination is performed using the reduced object width WO. As a result, the lap rate RR decreases, whereby the PCS becomes less likely to be activated.

On the other hand, when the radar target RT is located in the near area NA (step S18: YES), in step S19, the activation condition of the PCS is changed. In step S19, whether the activation condition of the PCS should be changed or maintained is determined by determining the probability of the object Ob colliding with the own vehicle CS based on various conditions.

Figure 7:
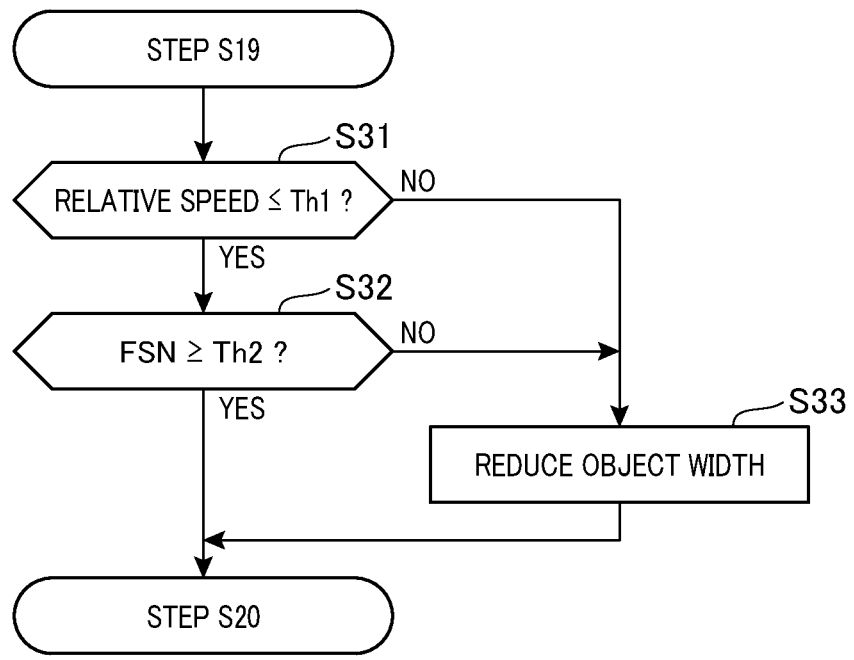
FIG. 7 is a diagram for explaining a detailed process performed in step S19 of FIG. 5.

Next, the detailed process performed in step S19 of FIG. 5 will be described with reference to FIG. 7. In the process shown in FIG. 7, when all the conditions from step S31 to step S32 are satisfied, it is determined that there is a high probability of collision between the object Ob and the own vehicle CS, and the object width WO is maintained. Thus, step S19 serves as a maintaining step.

First, in step S31, the relative speed Vr of the radar target RT with respect to the own vehicle CS is determined. Since the TTC is calculated by dividing the relative distance Dr by the relative speed Vr, if the relative distance Dr has the same value, the smaller the relative speed Vr, the larger the TTC until a collision between the radar target RT and the own vehicle CS. Therefore, if the relative speed Vr is small, each operation of the PCS is less likely to be executed even after the radar target RT has entered the near area NA, as compared with the case where the relative speed Vr is large.

Thus, when the relative speed Vr is larger than a threshold Th1 (step S31: NO), the process proceeds to step S33, in which the object width WO is reduced. The reduction of the object width WO performed in step S33 may be performed in the same manner as the reduction of the object width WO performed in step S20. On the other hand, when the relative speed Vr is equal to or less than the threshold Th1 (step S31: YES), the process proceeds to step S32. Step S31 serves as a relative speed acquisition section.

In step S32, the detection count DN of the fusion target FT before the image loss is determined. Since the detection count DN indicates the number of times the radar target RT was detected as the fusion object FT in the past, if the detection count DN is small, the reliability of the fusion target FT is low. For example, in the case where the detection of the fusion target FT is accidental due to noise or the like, the detection count DN has a low value. Thus, when the detection count DN is smaller than a threshold Th2, the process proceeds to step S33, in which the object width WO is reduced.

On the other hand, when the detection count DN is equal to or more than the threshold Th2 (step S32: YES), the process shown in FIG. 6 halts. That is, the object width WO is maintained. Therefore, since the collision determination is performed based on the maintained object width WO in step S21 of FIG. 5, the PCS becomes more likely to be activated.

Figure 8A:
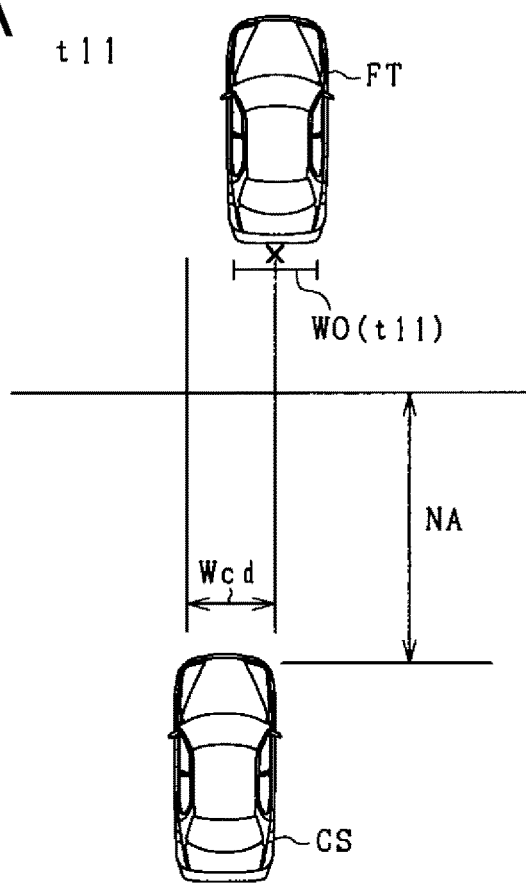
FIG. 8A is a diagram for explaining a change in operability of the PCS.
Figure 8B:
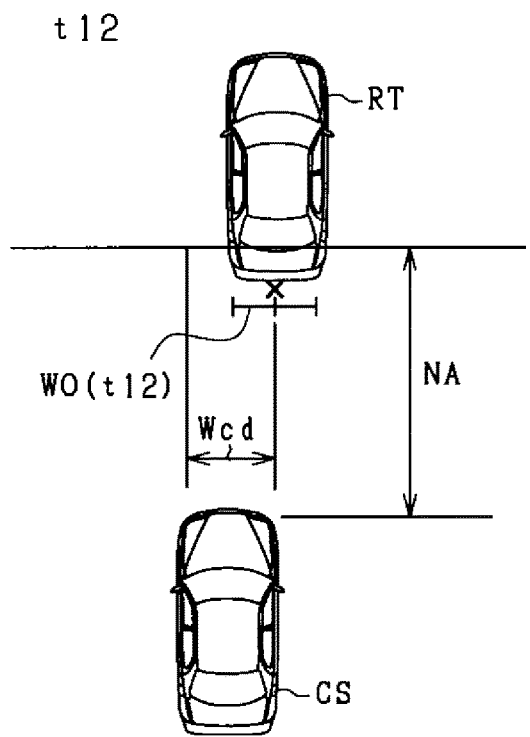
FIG. 8B is a diagram for explaining a change in operability of the PCS.

Next, with reference to FIGS. 8A and 8B, the change in operability of the PCS in the case where the ECU 20 executes the process in FIG. 5 will be described. FIGS. 8A and 8B show the change in the object width WO when the ECU 20 executes the process shown in FIG. 5, and, for comparison, FIG. 8C shows the change in the object width WO when the ECU 20 does not execute the process shown in FIG. 5.

As shown in FIG. 8A, at time t11, it is assumed that, in a state where a fusion target FT is being detected in front of the own vehicle CS by the ECU 20, the relative distance Dr of the fusion target FT relative to the own vehicle CS has got smaller. Then, as shown in FIG. 8B, it is assumed that, at time t12, the object enters the near area NA and image loss occurs.

As a result of the image loss, the position of the object (radar target RT) is detected only from the radar information, and the object width WO can be no longer acquired. In FIG. 8B, since the radar target RT is located in the near area NA at time t12, the object width WO(t12) at time t12 is maintained to be the same as the object width WO at time t11. On the other hand, in FIG. 8C shown as a comparison, when the object is located in the near area NA, the object width WO(t12) at time t12 is reduced from the object width WO(t11) at time t11 shown in FIG. 8A.

Figure 8C:
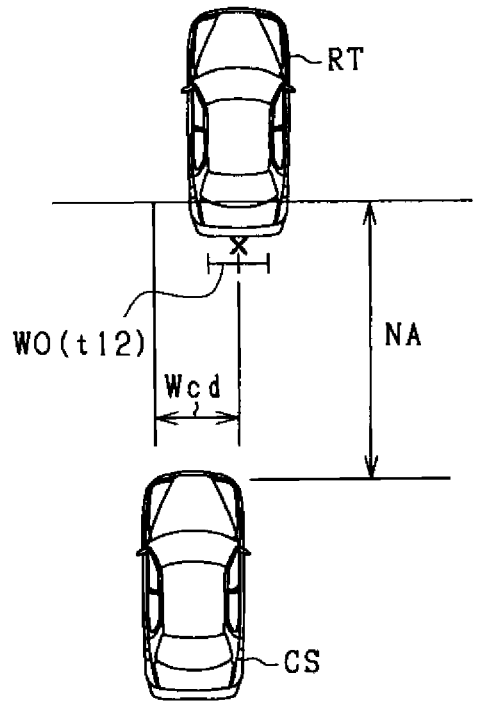
FIG. 8C is a diagram for explaining a change in operability of the PCS.

Therefore, in FIG. 8B, by maintaining the object width WO(t12), the lap ratio RR indicating its ratio to the judging area Wcd is larger than the lap ratio RR(c) in the case of FIG. 8(c). As a result, the PCS becomes more likely to be activated, and activation delay or inactivation of the PCS for radar targets RT will be suppressed.

As described above, in the first embodiment, when image loss has occurred from a state where a fusion object FT is being detected and the state changes to a state where the object is detected only by the radar information, if the position of the radar target RT is located in the near area NA in front of the vehicle, the ECU 20 maintains the activation condition of the PCS. According to this configuration, even when image loss has occurred by the object entering the near area NA, it is possible to suppress activation delay or inactivation of the PCS for this object.

The ECU 20 acquires the object width WO indicating the lateral size of the object, and based on the amount of overlap (RR) in the lateral direction between the acquired object width WO and the judging area Wcd set in front of the vehicle, changes the activation condition of the PCS. When the object is located in the near area NA, the ECU 20 maintains the object width at the value in the state where the object is detected from the image information and the radar information. According to the above configuration, it becomes possible to change the activation condition of the PCS in a simpler way.

Even when the object is located near the own vehicle CS in the vehicle traveling direction, if the object is located far from the own vehicle CS in the lateral direction, the probability of a collision between the object and the own vehicle CS is low. Therefore, when the position Pr of the object acquired from the radar information is outside the preset near area NA, the ECU 20 determines that the object is not located in the near area NA. According to the above configuration, when the probability of a collision between the object and the own vehicle CS is low, priority is given to the decreased detection accuracy, and therefore appropriate PCS can be implemented.

When the relative speed Vr of the object is small, the TTC, which is margin time until the object and the own vehicle CS collide with each other, increases, and even if this object is located in the near area NA, the PCS is less likely to be executed as compared with an object having a large relative speed Vr. Therefore, when the object is located in the near area NA, on condition that the relative speed Vr of the object is equal to or less than a predetermined value, the ECU 20 maintains the activation condition of the PCS. According to the above configuration, when the object Ob is located in the near area NA, activation of the PCS is urged, and inactivation of the PCS can be suppressed.

Second Embodiment

In the second embodiment, when the object is located in the near area NA, if the object moves in a direction away from the own vehicle CS, the ECU 20 makes the PCS less likely to be activated.

Figure 9:
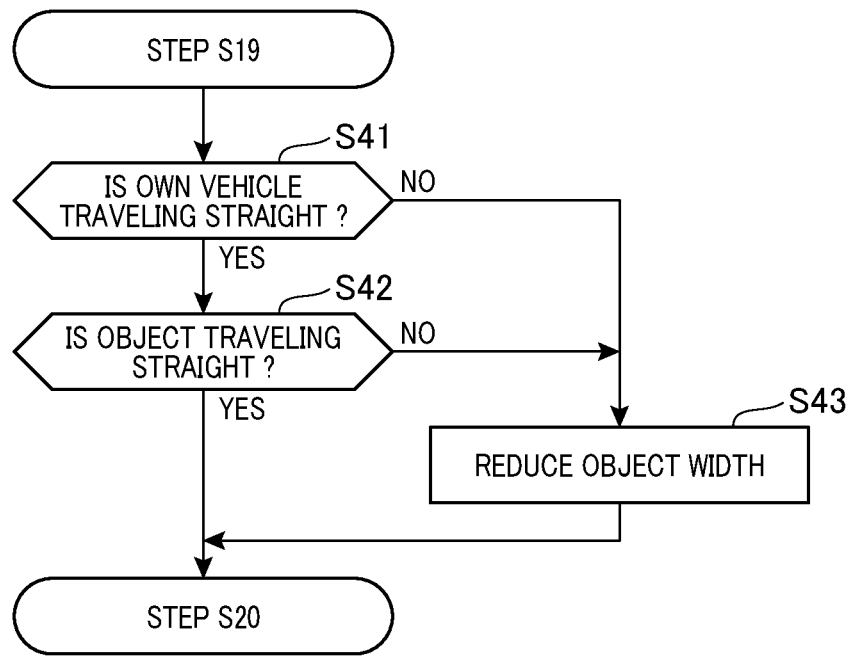
FIG. 9 is a flowchart illustrating a process carried out in step S19 according to a second embodiment.

FIG. 9 is a flowchart illustrating a process carried out in step S19 of FIG. 5 according to the second embodiment.

In step S41, it is determined whether or not the own vehicle CS is traveling straight. For example, whether or not the own vehicle CS is traveling straight or tuning right or left is determined based on the output from the turning motion detection sensor 34. If the own vehicle CS is not traveling straight (step S41: NO), the object width WO is reduced in step S43.

Figure 10A:
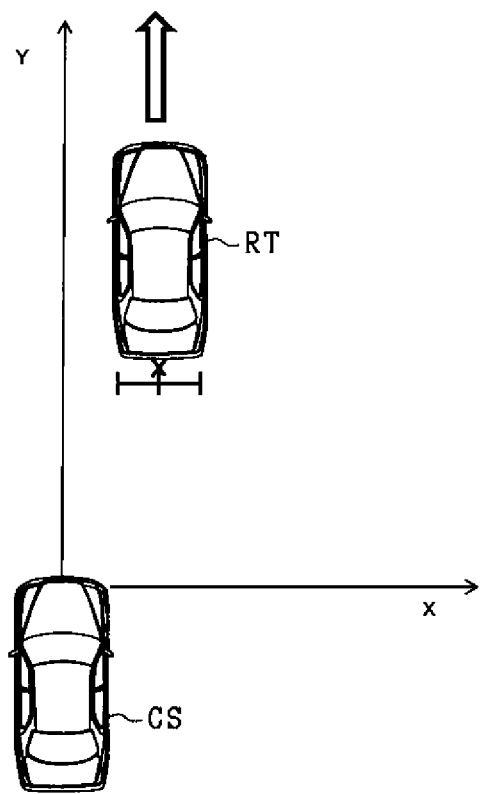
FIG. 10A is a diagram for explaining movement of an object in the near area NA.

If the own vehicle CS is traveling straight (step S41: YES), in step S42 it is determined whether or not the radar target RT located in the near area NA is moving straight. FIG. 10 is a diagram for explaining the movement of the object in the near area NA. As shown in FIG. 10A, when an object detected in front of the own vehicle CS is moving straight ahead in the vehicle traveling direction (Y axis direction), there is a high probability that the object and the own vehicle CS collide with each other. In such case, it is preferable to maintain the object width WO.

Figure 10B:
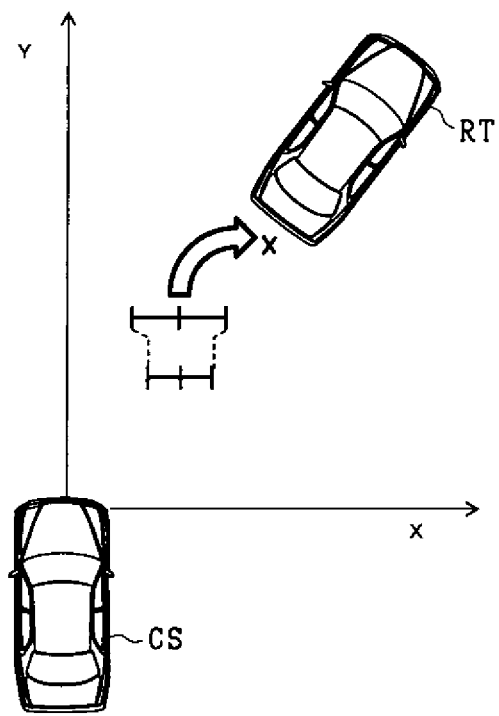
FIG. 10B is a diagram for explaining movement of the object in the near area NA.

On the other hand, as shown in FIG. 10B, when the object moves in the lateral direction (X axis direction) with respect to the vehicle traveling direction (Y axis direction) by turning right or left in the near area NA, since the object moves away from the course of the own vehicle CS, the probability of a collision between the object and the host vehicle CS decreases. In such a case, if the object width WO is maintained, it may be erroneously judged that there is a probability of a collision even for an object that actually has a low probability of a collision, and this may cause unnecessary activation of the PCS.

Therefore, in step S42, a change in the position of the radar target RT is detected using the radar information, and based on this change in position, it is determined whether the radar target RT is moving straight ahead, or turning right or left. Alternatively, it may be determined that the radar target RT has turned right or left when it is detected, using the radar information, that the lateral position has changed after deceleration in the vehicle speed of the radar target RT. Thus, step S42 serves as a movement determination section.

When the radar target RT is moving straight (step S42: YES), the process of FIG. 9 halts without reducing the object width WO. Therefore, the activation condition of the PCS is maintained. On the other hand, when the radar target RT is not moving straight ahead but the object is turning right or left (step S42: NO), in step S43, the activation condition is changed by reducing the object width WO. Therefore, in step S20 of FIG. 5, collision determination for the object is performed using the maintained or reduced object width WO.

As described above, when an object located in the near area NA is moving in a direction away from the own vehicle CS by turning right or left, as compared with the case where both the object and the own vehicle CS are moving straight ahead, the probability of collision is low. In such case, the ECU 20 makes the PCS less likely to be activated. According to the above configuration, when the probability of a collision between the object and the own vehicle CS is low, priority is given to the decreased detection accuracy, and therefore appropriate PCS can be implemented.

Third Embodiment

In the third embodiment, the area set as the near area NA is different from those of the first and second embodiments.

Figure 11:
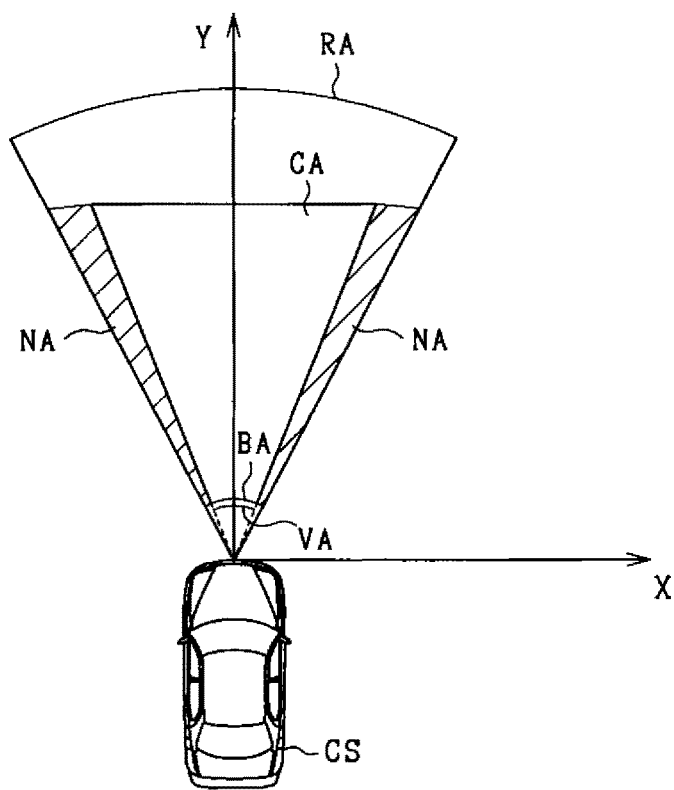
FIG. 11 is a diagram for explaining a position of a near area in a third embodiment.

FIG. 11 is a diagram for explaining the position of the near area NA in the third embodiment. In the third embodiment, the radar area RA of the radar sensor 32 is set to be wider than the image capturing area CA of the image sensor 31. The near area NA is set as an area (VA to BA) that extends horizontally from the angle of view VA of the image sensor 31 by a boundary angle BA. Further, since the near area NA is an area in which the first position can be detected from the object but not the second position, in the present embodiment, the near area NA is set as an area outside the image capturing area CA of the image sensor 31 but inside the radar area RA of the radar sensor 32.

Figure 12:
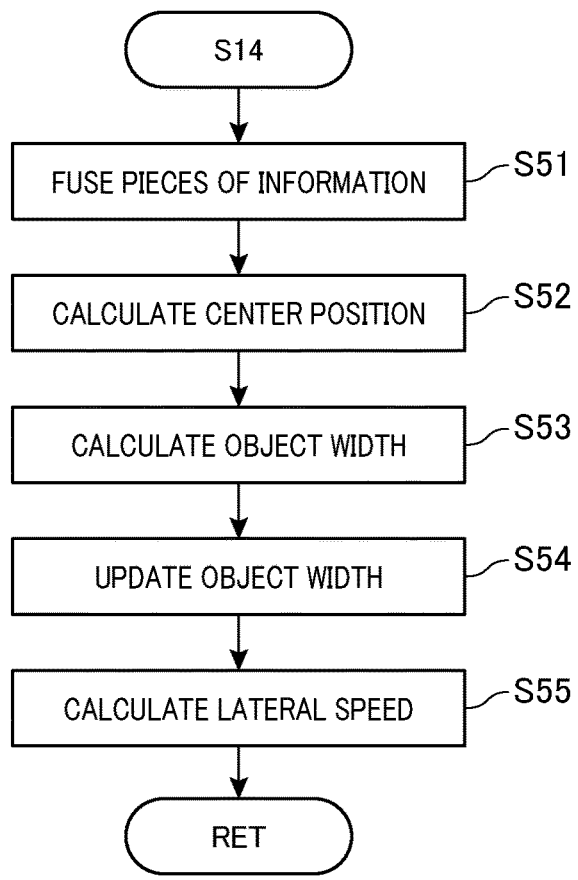
FIG. 12 is a flowchart illustrating a process carried out in step S14 of FIG. 5 according to a third embodiment.

FIG. 12 is a flowchart illustrating a process carried out in step S14 of FIG. 5 according to the third embodiment. In the process shown in FIG. 12, when the radar information and the image information are detected from an object, the lateral center position of the object, the object width WO, and the relative speed in the lateral direction are recorded. In the following description, the process of FIG. 12 performed previously by the ECU 20 is described as a previous process and the process of FIG. 12 performed currently is described as a current process.

In step S51, the distance to the object detected as the radar information is fused with the direction of the object detected as the image information.

Figure 13:
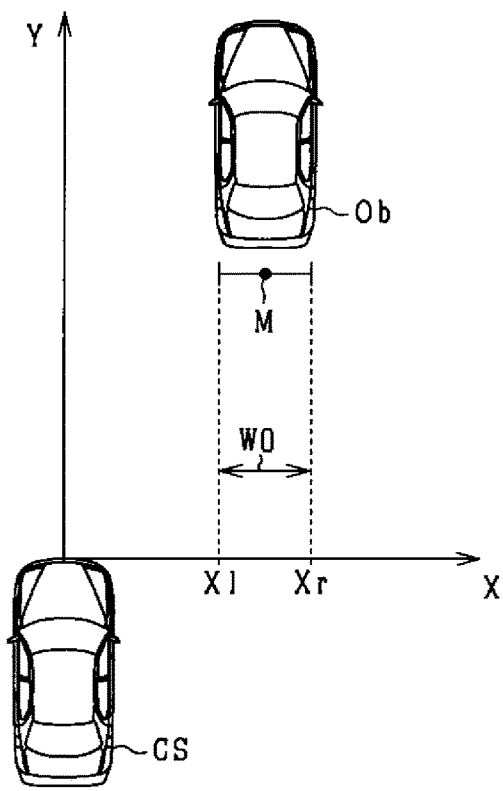
FIG. 13 is a diagram for explaining the center position and the object width.

In step S52, the lateral center position of the object is calculated based on the image information acquired in step S11 of FIG. 5. In the present embodiment, as shown in FIG. 13, the center position of the left and right lateral positions Xr, Xl included in the image information is calculated as the lateral center position of the object. Step S52 serves as a center position calculation section.

In step S53, the object width WO is calculated. In this embodiment, the object width WO is calculated using the left and right lateral positions Xr, Xl of the object included in the image information. In this embodiment, the object width WO is calculated by using the following expression (1).

$$WO = |Xr - Xl| \quad (1).$$

Note that, in the case where the image sensor 31 is configured to output an image width angle indicating the difference between the azimuth angles of the left and right lateral positions of the object, the object width WO may be calculated as below. In this case, in step S53, the object width may be calculated using the image width angle and the distance from the own vehicle to the object.

In step S54, the maximum value of the object width WO is updated. For example, the object width WO held in the previous process is compared with the object width WO recorded in the previous process, and the object width WO is updated to the larger object width WO. Thus, steps S53 and S54 serve as an object width calculation section.

In step S55, the lateral relative speed of the object with respect to the own vehicle is calculated. For example, the lateral relative speed is calculated from the lateral position difference between the position of the fusion information generated in step S51 in the previous process, and the position of the fusion information generated in step S51 in the current process. Thus, step S54 serves as a lateral speed calculation section. Upon completion of the process of step S55, the process returns to the flowchart shown in FIG. 5.

Figure 14:
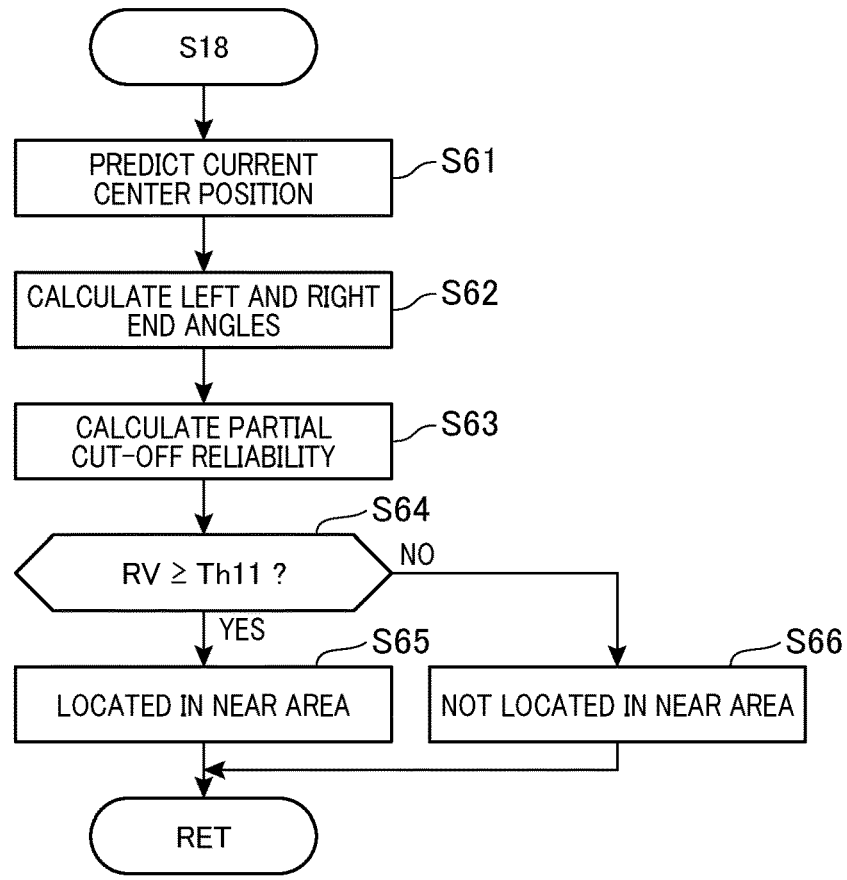
FIG. 14 is a flowchart illustrating a process carried out in step S18 of FIG. 5 according to the third embodiment.
Figure 15:
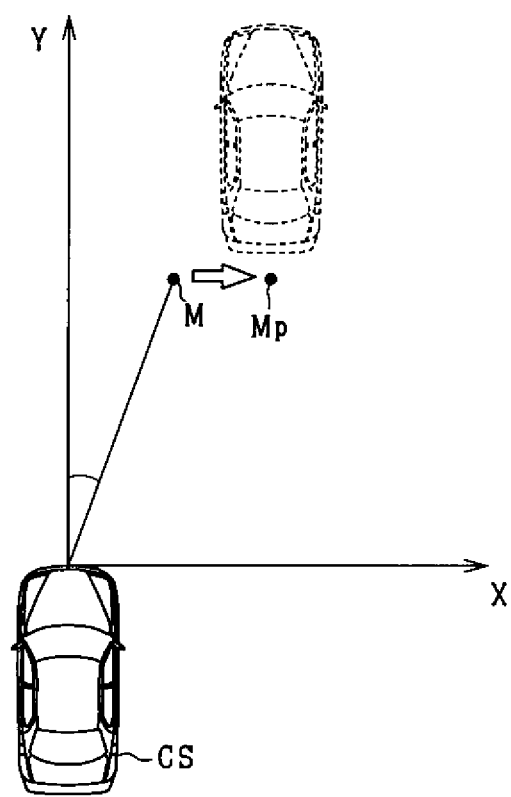
FIG. 15 is a diagram for explaining a predicted value of the center position.

Next, a process of determining whether or not a part of the object is located in the near area will be described with reference to FIGS. 14 and 15. The process shown in FIG. 14 is a process executed in step S18 of FIG. 5.

In step S61, a predicted lateral center position of the object at the present time is calculated based on the center position calculated in the past from the present time and the lateral speed of the object. In the present embodiment, the predicted center position of the object width of the object at the present time is calculated based on the image information calculated in step S52 and the lateral speed of the object calculated in step S55. As shown in FIG. 15, a distance corresponding to the lateral relative speed of the object recorded in step S54 is added to the center position M of the object width calculated from the image information held in step S52 to thereby calculate the predicted center position Mp of the current center position of the object. Step S61 serves as a position prediction section.

Instead of calculating the predicted center position Mp based on a center position recorded in the past and the lateral speed of the object according to the image information in step S61, it is also possible to calculate the predicted center position Mp based on a center position recorded in the past and the lateral speed of the object according to the radar information.

In step S62, based on the predicted center position calculated in step S61 and the object width WO held in step S53, the left and right end angles of the left and right lateral positions of the object at the present time are calculated. The right and left end angles indicate the azimuth angles of the left and right lateral positions of the object with respect to the own vehicle at the present time.

Figure 16:
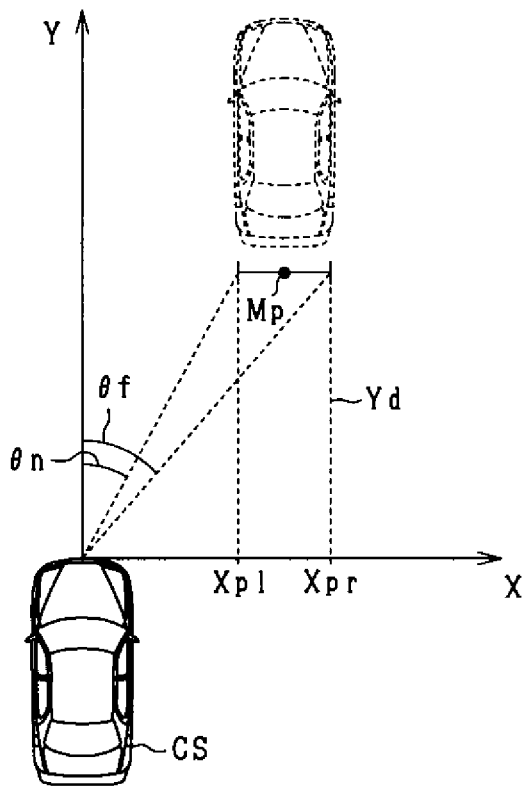
FIG. 16 is a diagram for explaining left and right end angles.

In the present embodiment, as shown in FIG. 16, first, positions extending in the lateral direction for the object width WO updated in step S54 from the predicted center position Mp calculated in step S61 are calculated as the predicted lateral positions Xpr, Xpl of the left and right lateral positions of the object. Next, using the calculated predicted lateral positions Xpr, Xpl, the left and right end angles indicating the azimuth angles of the left and right lateral positions of the object at the present time are calculated. In the present embodiment, the left and right end angles are defined so that an angle increase to the right from the imaging axis is plus (positive), and an angle increase to the left from the imaging axis is minus (negative).

When the one of the left and right end angles that is closer to the own vehicle in the lateral direction is represented by $\theta n$ and the other one of the left and right end angles that is further from the own vehicle in the lateral direction is represented by $\theta f$, the relationship between the left and right end angles and the predicted lateral positions can be calculated by the following expressions (2) and (3).

$$\tan \theta n = X1/Yd \quad (2)$$

$$\tan \theta f = X2/Yd \quad (3)$$

In the above expressions, X1 indicates the one of the predicted lateral positions Xpr and Xpl that is closer to the own vehicle, and X2 indicates the other one of the predicted lateral positions Xpr and Xpl that is further from the own vehicle. In FIG. 16, Xpl is the predicted lateral position X1 closer to the own vehicle and Xpr is the predicted lateral position X2 further from the own vehicle. Yd indicates the distance from the own vehicle to the object, and in the present embodiment, the distance from the own vehicle to the object included in the fusion information is used.

The ECU 20 can calculate the left and right end angles by using the following expressions (4) and (5), respectively, based on the above expressions (2) and (3).

$$\theta n = \arctan(X1/Yd) \quad (4)$$

$$\theta f = \arctan(X2/Yd) \quad (5)$$

Thus, step S62 serves as an azimuth angle calculation section.

In steps S63 to S66, based on the left and right end angles calculated in step S62, it is determined whether or not the object is located in the near area. In this embodiment, based on the left or right end angle $\theta f$ of the left and right end angles calculated in step S62 that is further from the own vehicle, a partial cut-off reliability indicating the probability of a part of the object being located in the near area is calculated. Thus, in this embodiment, steps S63 to S66 serve as a position determination section.

Figure 17:
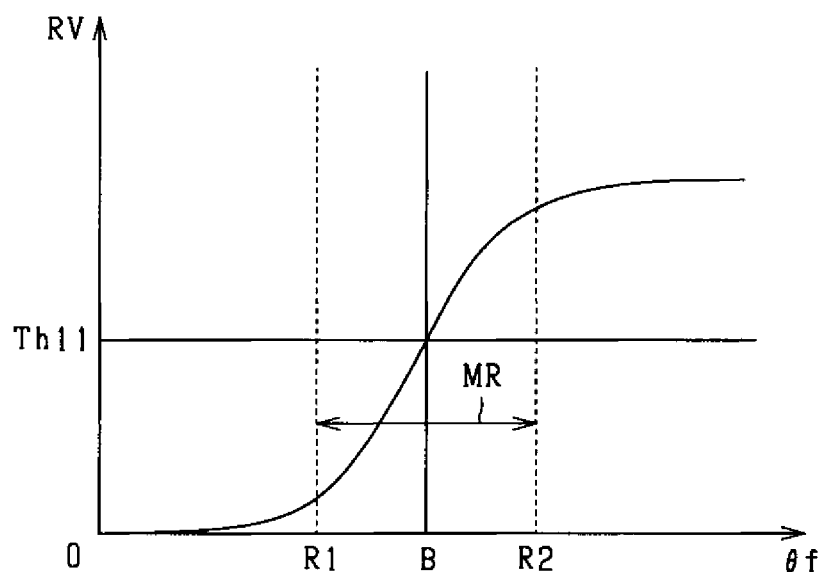
FIG. 17 is a diagram for explaining partial cut-off reliability.

FIG. 17 is a graph for explaining the partial cut-off reliability, in which the abscissa represents the absolute value of the left and right end angle $\theta f$ and the ordinate represents partial cut-off reliability RV. The partial cut-off reliability RV is an evaluation value for determining whether or not the own vehicle is located in the near area based on the one of the left and right end angles that is further from the own vehicle in the lateral direction. In the present embodiment, the partial cut-off reliability is defined as a value between 0 and 100, and the greater the partial cut-off reliability, the greater the probability of a part of the object being located in the near area. Further, the partial cut-off reliability is defined so that its value increases nonlinearly as the value of the left or right end angle $\theta f$ that is further from the own vehicle increases.

Among the left and right end angles $\theta f$ on the horizontal axis, the reference angle B represents the absolute value of the angle from the imaging axis to the angle of view. In other words, when the left or right end angle $\theta f$ matches with the reference angle B, the end of the one of the left and right lateral positions of the object that is further from the own vehicle is located on the angle of view of the image sensor 51.

The partial cut-off reliability RV is set so that the increase rate of its value is greater in the central range MR, which is the range between predetermined angles R1 and R2 equally distanced from the reference angle B, than in the range equal to or less than the lower limit angle R1 and the range equal to or more than the upper limit angle R2. By making the increase rate in the central range MR larger than those in the other regions, it is possible to suppress the partial cut-off reliability RV changing greatly when the left or right end angle is smaller than the lower limit angle R1 or larger than the upper limit angle R2. As a result, the closer the left or right end angle $\theta f$ is to the angle of view, the greater the change in the partial cut-off reliability will be, and thus it is possible to reduce the influence of an attachment error of the image sensor 31 in the lateral direction with respect to the own vehicle and an error in the left and right end angles calculated in step S62.

In step S63, the partial cut-off reliability is calculated based on the left and right end angles. The partial cut-off reliability is calculated with respect to the one of the left and right end angles that is further from the own vehicle. For example, a map defining the relationship between the left or right end angle and the partial cut-off reliability shown in FIG. 17 is recorded, and by referring to this map, the partial cut-off reliability corresponding to the left or right end angle calculated in step S62 is calculated.

In step S64, a determination is carried out on the partial cut-off reliability calculated in step S63. In this embodiment, whether or not a part of the object is located in the near area is determined by comparing the partial cut-off reliability with a threshold Th11. The threshold Th11 is set based on the reference angle B indicating the absolute value of the angle from the imaging axis to the angle of view.

When the partial cut-off reliability is equal to or more than the threshold Th11 (step S64: YES), in step S65, a satisfaction flag indicating that a part of the object is located in the near area is set to true. On the other hand, when the partial cut-off reliability is less than the threshold Th11 (step S64: NO), in step S66, the satisfaction flag indicating that a part of the object is located in the near area is set to false. The satisfaction flag being false indicates that it has been determined that the object is not located in the near region.

Returning to FIG. 5, if the satisfaction flag is true, it is determined that the object is located in the near area (step S18: YES), and the activation condition of the PCS is maintained in step S19. For example, the object width WO is maintained at the object width WO of when the fusion is established. On the other hand, when the satisfaction flag is false, it is determined that the object is not located in the near area (step S18: NO), and the activation condition of the PCS is changed in step S20. For example, the object width WO is reduced from the object width WO of when the fusion is established.

As described above, in the third embodiment, when the state changes from a state where the object is detected by the radar information and the image information to a state where the object is detected only from the radar information, the ECU 20 calculates a predicted center position of the object at the present time based on the lateral center position of the object detected previously and the lateral speed of the object. Further, based on the calculated predicted center position and the object width, the ECU 20 calculates the left and right end angles indicating the azimuth angles (with respect to the own vehicle) of the left and right lateral positions of the object at the present time. Then, the ECU 20 determines, based on the calculated left and right end angles, whether or not the object is located in the near area. In this case, it is possible to appropriately determine whether or not the object is located in the near area even when the near area is an area extending outward in the horizontal direction for a certain angle from the angle of view of the image sensor 31.

Based on the calculated left and right end angles, the ECU 20 calculates a partial cut-off reliability indicating a probability of the object being located in the near area, and when the calculated partial cut-off reliability is equal to or more than a threshold, the ECU 20 determines that the object is located in the near area. The partial cut-off reliability has a value that increases nonlinearly as the left or right end angle of the object that is further from the own vehicle increases, and the increase rate of the partial cut-off reliability is greater in the central range, which is a range within a predetermined angle from the angle of view, than in the other regions. In this case, by making the increase rate in the central range larger than those in the other regions, the partial cut-off reliability tends to be large when the left or right end angle is larger than the lower limit of the central range. As a result, in the determination of whether or not the object is located in the near area, it is possible to reduce the influence of the attachment error of the image sensor 31 in the lateral direction with respect to the own vehicle, and the calculation error in the left and right end angles.

OTHER EMBODIMENTS

In the third embodiment described above, a determination of whether or not the object is turning left or right may be carried out by predicting future behavior of the object by using features of the object at the time when the fusion target FT has been established. For example, in step S14 of FIG. 5, the ECU 20 detects, from the image information, blinking of a turn indicator such as a blinker as a feature indicating right/left turn as the fusion information, and if the fusion target FT is not detected in the next process (step S13: NO), the previous object width WO may be reduced. Further, in step S14 of FIG. 5, it is possible to detect, based on the captured image, that the object has crossed over a partitioning white line at an intersection as the fusion information, and if the fusion target FT is not detected in the next process (step S13: NO), the previous object width WO may be reduced.

It is also possible to record the lateral position of the object at the time when the fusion target FT has been still established, and when image loss occurs, the activation condition of the PCS is changed based on the recorded lateral position of the object in the past. In this case, for example, in step S14 of FIG. 5, the ECU 20 acquires the lateral position of the object from the image information as the fusion information, and if the fusion target FT is not detected in the next process (step S13: NO), based on the lateral position acquired in step S14, the ECU 20 determines whether or not the object is located in the near area NA. Specifically, if the recorded lateral position of the object is inside the lateral range of the near area NA, the ECU 20 determines that the object is currently located in the near area NA.

Instead of uniformly maintaining the activation condition of the PCS when the object is located in the near area NA, the activation condition of the PCS may be changed based on the position of the object within the near area NA. In this case, in step S19 of FIG. 5, when the object is located in the near area NA, and the relative distance Dr between the own vehicle CS and the object is equal to or more than a threshold value, the ECU 20 maintains the activation condition of the PCS. With the same relative speed Vr, the larger the relative distance Dr, the greater the TTC. Therefore, when the relative distance Dr after the radar target RT has entered the near area NA is large, it is likely that the PCS is not performed as compared with the case where the relative distance Dr is small. Therefore, when the relative distance Dr is equal to or more than a predetermined value in step S19, the ECU 20 makes the PCS more likely to be activated by maintaining the object width WO.

Instead of including the ECU 20 and the image sensor 31 as separate units, the PCSS 100 may include the ECU 20 and the image sensor 31 as an integrated device. In this case, the above-described ECU 20 is provided inside the image sensor 31. Further, instead of the radar sensor 32, the PCSS 100 may be provided with a laser sensor that uses a laser beam as the transmission wave.

The activation condition of the PCS may be maintained when the object is located in the near area NA, and the vehicle speed of the own vehicle CS is equal to or more than a predetermined value.

Although the present disclosure is described based on examples, it should be understood that the present disclosure is not limited to the examples and the structures thereof. The present disclosure encompasses various modifications and variations within the scope of equivalence. In addition, the scope and the spirit of the present disclosure include various combinations and embodiments, and other combinations and embodiments configured by incorporating only one or more, or less elements therein.

The invention claimed is:

1. A vehicle control apparatus for detecting an object by using first information, which is a detection result of the object based on a reflected wave corresponding to a transmission wave, and second information, which is a detection result of the object based on a captured image of an area in front of a vehicle captured by an image capturing means, the vehicle control apparatus comprising:
   a control section which performs collision avoidance control for avoiding a collision with the object based on at least one of the first information and the second information;
   a position determination section which, when a state changes from a state where the object is detected by the first information and the second information to a state where the object is detected only by the first information, determines whether or not the object is located in a near area predetermined as an area in front of the vehicle in which the second information is not able to be acquired; and
   a maintaining section which, when it is determined that the object is located in the near area, maintains an activation condition of the collision avoidance control to that in the state where the object is detected by the first information and the second information.

2. The vehicle control apparatus according to claim 1, wherein
   the control section acquires an object width indicating a lateral size of the object, and based on an amount of overlap in a lateral direction between the acquired object width and a judging area set in front of the vehicle, changes the activation condition of the collision avoidance control, and when the object is located in the near area, the maintaining section maintains the object width at a size in the state where the object has been detected by the first information and the second information.

3. The vehicle control apparatus according to claim 1, wherein the position determination section presets a predetermined distance from a center of the vehicle in a lateral direction of the vehicle as a lateral range of the near area, and when a position of the object in the lateral direction acquired based on the first information is inside the range of the near area, the position determination section determines that the object is located in the near area.

4. The vehicle control apparatus according to claim 1, further comprising a movement determination section which determines whether or not the object is moving in a direction away from the vehicle in a lateral direction of the vehicle, wherein
when the position determination section determines that the object is located in the near area and the object is moving in the direction away from the vehicle in the lateral direction, the maintaining section changes the activation condition so as to make the collision avoidance control less likely to be activated.

5. The vehicle control apparatus according to claim 1, further comprising a relative speed acquisition section which acquires a relative speed of the object with respect to the vehicle, wherein
when it is determined that the object is located in the near area, on condition that the relative speed is equal to or less than a predetermined value, the maintaining section maintains the activation condition.

6. The vehicle control apparatus according to claim 1, wherein, when the state changes from the state where the object is detected by the first information and the second information to the state where the object is detected only by the first information, and the position determination section determines that the object is not located in the near area, the maintaining section changes the activation condition so as to make the collision avoidance control less likely to be activated.

7. The vehicle control apparatus according to claim 1 or 2, wherein the near area is an area extending from an angle of view of the image capturing means for a predetermined angle in a horizontal direction,
the vehicle control apparatus further comprising:
a center position calculating section which calculates a lateral center position of the object based on the second information in the state where the object is detected by the first information and the second information,
an object width calculating section which calculates an object width indicating a lateral size of the object based on the second information in the state where the object is detected by the first information and the second information,
a lateral speed calculating section which calculates a lateral speed of the object based on at least one of the first information and the second information,
a position prediction section which, when the state changes from the state where the object is detected by the first information and the second information to the state where the object is detected only by the first information, calculates a predicted center position in the lateral direction of the object at a present time based on the lateral center position of the object calculated previously and the lateral speed of the object, and
an azimuth angle calculating section which calculates azimuth angles of left and right lateral positions of the object with respect to the own vehicle at the present time based on the calculated predicted center position and the object width,
wherein the determination section determines whether or not the object is located in the near area based on the calculated azimuth angles of the left and right lateral positions.

8. The vehicle control apparatus according to claim 7, wherein the determination section calculates a partial cut-off reliability indicating a probability of the object being located in the near area based on the azimuth angles of the left and right lateral positions, and when the calculated partial cut-off reliability is equal to or more than a threshold, the determination section determines that the object is located in the near area, and
the partial cut-off reliability is set so that its value increases nonlinearly as the azimuth angle of the object that is further from the own vehicle increases, and is set so that an increase rate in a range of a predetermined angle with respect to the angle of view is higher than increase rates in other ranges.

9. A vehicle control method for detecting an object by using first information which is a detection result of the object based on a reflected wave corresponding to a transmission wave, and second information which is a detection result of the object based on a captured image of an area in front of a vehicle captured by an image capturing means, the vehicle control method comprising:
a controlling step of performing collision avoidance control for avoiding a collision with the object based on at least one of the first information and the second information;
a position determination step which, when a state changes from a state where the object is detected by the first information and the second information to a state where the object is detected only by the first information, determines whether or not the object is located in a near area predetermined as an area in front of the vehicle in which the second information is not able to be acquired; and
a maintaining step which, when it is determined that the object is located in the near area, maintains an activation condition of the collision avoidance control to that in the state where the object is detected by the first information and the second information.

* * * * *